United States Patent Office 2,918,344
Patented Dec. 22, 1959

2,918,344

PROCESS FOR DYEING POLYETHYLENE TEREPHTHALATE

Walter Jenny, Basel, Switzerland, assignor to Ciba Limited, Basel, Switzerland, a Swiss firm No Drawing. Application July 23, 1956
Serial No. 599,315

Claims priority, application Switzerland August 2, 1955

10 Claims. (Cl. 8—39)

This invention is based on the observation that valuable dyeings and prints can be produced on hydrophobic textile materials by using as dyestuffs 1-amino-2-nitroanthraquinones which contain a single anthraquinone nucleus and contain in an α-position of a nucleus an acylamino group of which the acyl residue is that of an aliphatic monocarboxylic acid of low molecular weight.

The term "hydrophobic fibers" includes principally fully synthetic fibers, and above all polyester fibers, for example, polyethylene terephthalate fibers which are known in commerce under the names "Terylene" and "Dacron," and also artificial fibers of polyamides or polyurethanes, polyacrylonitrile or polyvinyl chloride. There are also included artificial fibers of cellulose esters or ethers, for example, cellulose acetate artificial silk, which as compared with the above-mentioned fully synthetic fibers exhibit a higher capacity for absorbing water, but in contradistinction to the markedly hydrophilic fibers, such as wool, cotton and regenerated cellulose, possess a considerably lower capacity for absorbing water.

The 1-amino-2-nitroanthraquinones used in the present process contain in an α-position of the anthraquinone nucleus an acylamino group of which the acyl radical is that of an aliphatic monocarboxylic acid of low molecular weight, advantageously one which contains 2–6 carbon atoms. Especially suitable 4-acylaminoanthraquinones are those which contain an acyl radical of the formula

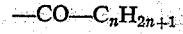

in which $n$ is a whole number not greater than 5, for example, an acetyl, propionyl and especially a butyryl, isobutyryl or isovaleroyl radical.

Of special interest are those 1-amino-2-nitro-α-acylaminoanthraquinones which contain in the 1-position a primary amino group and of which the acylamino group is likewise derived from a primary amino group. Among these compounds there may be mentioned more especially 1-amino-2-nitro-4-acylaminoanthraquinones, for example, 1-amino-2-nitro-4-acetylaminoanthraquinones, 1-amino-2-nitro-4-propionylaminoanthraquinones and especially 1-amino-2-nitro-4-butyrylaminoanthraquinone and 1-amino-2-nitro-4-isovaleroylaminoanthraquinone. Some of these compounds are known and can be made either by monoacylating a 1:4-diamino-2-nitroanthraquinone or by partial hydrolysis of a 1:4-diacylamino-2-nitroanthraquinone.

In some cases it is especially advantageous to use mixtures of different dyestuffs of the kind used in the present process.

The aforesaid 1-amino-2-nitro-α-acylaminoanthraquinones are advantageously used for dyeing in a finely divided form, and used for dyeing with the addition of a dispersing agent, such as soap, sulphite cellulose waste liquor or a synthetic detergent, or a combination of different wetting and dispersing agents. It is of advantage to convert the dyestuff before dyeing into a dyestuff preparation, which contains a dispersing agent and the finely subdivided dyestuff in a form such that upon diluting the dyestuff preparation with water a fine dispersion is obtained. Such dyestuff preparations can be obtained in known manner, for example, by precipitating the dyestuff from sulphuric acid and grinding the resulting suspension with sulphite cellulose waste liquor, or, if desired, by grinding the dyestuff in a highly efficient grinding apparatus in the dry or wet state with or without the addition of a dispersing agent during the grinding process.

In order to produce strong dyeings on polyethylene terephthalate fibers it is of advantage to add to the dyebath a swelling agent, or to carry out the dyeing process at a temperature above 100° C., for example under pressure at 130° C. Suitable swelling agents are aromatic carboxylic acids, for example benzoic acid or salicylic acid, phenols, for example ortho- or parahydroxydiphenyl, halogenated aromatic compounds, such as chlorobenzene, ortho-dichlorobenzene or trichlorobenzene, phenyl methyl carbinol or diphenyl. For dyeings under pressure it is of advantage to keep the dyeing bath slightly acid, for example by adding a weak acid, such as acetic acid. The dyeings so produced are characterised in general by their excellent fastness to light.

The following examples illustrate the invention, the parts and percentages being by weight:

Example 1

1 part of an aqueous paste of 1-amino-2-nitro-4-butyrylaminoanthraquinone, prepared in the manner described below, is ground with approximately 1 part of dried sulphite cellulose waste liquor in a roller mill to form a fine paste having a dyestuff content of about 10 percent.

100 parts of "Terylene" fibrous material are precleaned in a bath containing in 1000 parts of water 1-2 parts of the sodium salt of N-benzyl-μ-heptadecylbenzimidazole disulphonic acid and 1 part of a concentrated aqueous solution of ammonia, for ½ hour. The material is then entered into the dyebath containing 3000 parts of water which the dyestuff paste described in the preceding paragraph have been dispersed with the addition of 4 parts of the sodium salt of N-benzyl-μ-heptadecyl-benzimidazole disulphonic acid. The whole is heated in a pressure vessel at 130° C. and maintained at that temperature for about ½ hour. The material is then rinsed well and, if necessary, washed with a solution containing in 1000 parts of water 1 part of the sodium salt of N-benzyl-μ-heptadecyl-benzimidazole disulphonic acid, for ½ hour at 60–80° C. There is obtained a strong navy blue dyeing of excellent fastness to sublimation, light and gases. On using as dyestuff the 1-amino-2-nitro-4-isovaleroylaminoanthraquinone, there is obtained a beautiful reddish blue dyeing of good fastness to sublimation, light and gases.

On using as dyestuff the 1-amino-2-nitro-4-acetylaminoanthraquinone, there are obtained weaker, but also very fast navy blue shades.

The 1-amino-2-nitro-4-butyrylamino-anthraquinone used in this example may be prepared as follows:

28 parts of 1:4-diamino-2-nitroanthraquinone, 20 parts of butyryl chloride, 20 parts of dimethyl aniline and 800 parts by volume of chlorobenzene are boiled under reflux for 1½ hours. After cooling the mixture, a large quantity of petroleum ether is added, the whole is allowed to stand for one hour in ice-water and the precipitated dyestuff is filtered off with suction, washed with petroleum ether and dried. The dyestuff is obtained in very good yield in the form of a violet crystalline powder.

The 1-amino-2-nitro-4-acetylaminoanthraquinone and the 1-amino-2-nitro-4-isovaleroylaminoanthraquinone may be prepared in analogous manner.

Example 2

100 parts of "Terylene" fibrous material are precleaned in a bath containing in 1000 parts of water 1-2 parts of the sodium salt of N-benzyl-µ-heptadecyl-benzimidazole disulphonic acid and 1 part of a concentrated aqueous solution of ammonia, for ½ hour. The material is then preswelled in a dyebath containing in 3000 parts of water 15 parts of a mixture of approximately equal parts of orthohydroxydiphenyl, pine oil and Turkey red oil and 15 parts of acetic acid, for ½ hour at 80° C. The bath is then allowed to cool to 50° C., and the dyestuff paste prepared as described in the first paragraph of Example 1 is added. The bath is raised to the boil in the course of ½–¾ hour, and dyeing is carried on for 1–1½ hours as near as possible to the boiling temperature. The material is then rinsed well and, if desired, washed with a solution containing in 1000 parts of water 1 part of the sodium salt of N-benzyl-µ-heptadecyl-benzimidazole disulphonic acid for ½ hour at 60–80° C. A strong navy blue dyeing is obtained of excellent fastness to sublimation, light and gases.

Example 3

1.25 parts of the dyestuff preparation obtained as described in the first paragraph of Example 1 are suspended at 60° C. in about 100 parts of soft water in which are dissolved 2 grams of soap per liter, and the suspension is added to a dyebath of 3000 parts of soft water containing 6 parts of soap. 100 parts of cellulose acetate artificial silk are then entered at 48° C., the temperature is slowly raised to 80° C., and dyeing is carried on for one hour at that temperature. The material is then rinsed, and finished in the usual manner. The cellulose acetate artificial silk is dyed a violet tint of excellent fastness to gases.

What is claimed is:

1. A process for dyeing polyethylene terephthalate fibers, wherein there is used as dyestuff a 1-amino-2-nitro-4-acylaminoanthraquinone, which contains a single anthraquinone nucleus and of which the amino group is a primary one and of which the acylamino group is derived from a primary amino group having an acyl radical of an aliphatic monocarboxylic acid which contains 2–6 carbon atoms.

2. A process for dyeing polyethylene terephthalate fibers, wherein there is used as dyestuff an anthraquinone compound of the formula

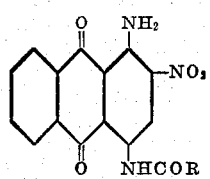

in which is an acyl radical —COR of an aliphatic monocarboxylic acid having 2–6 carbon atoms.

3. A process for dyeing polyethylene terephthalate fibers, wherein there is used as dyestuff an anthraquinone compound of the formula

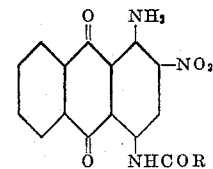

in which R has the formula $-C_nH_{2n+1}$ in which $n$ represents a whole number not greater than five.

4. A process for dyeing polyethylene terephthalate fibers, wherein there is used as dyestuff the compound of of the formula

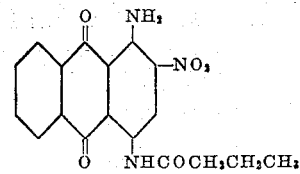

5. A process for dyeing polyethylene terephthalate fibers, wherein there is used as dyestuff the compound of the formula

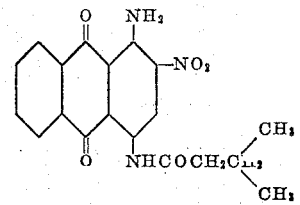

6. Polyethylene terephthalate fibers dyed with a 1-amino-2-nitro-4-acylaminoanthraquinone, which contains a single anthraquinone nucleus and of which the amino group is a primary one and of which the acylamino group is derived from a primary amino group having an acyl radical of an aliphatic monocarboxylic acid which contains 2–6 carbon atoms.

7. Polyethylene terephthalate fibers dyed with an anthraquinone compound of the formula

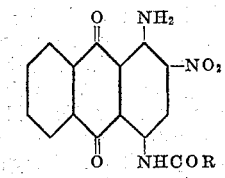

in which —COR is an acyl radical of an aliphatic monocarboxylic acid having 2–6 carbon atoms.

8. Polyethylene terephthalate fibers dyed with an anthraquinone compound of the formula

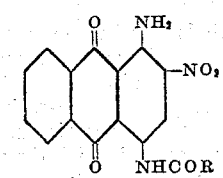

in which R has the formula $-C_nH_{2n+1}$ in which $n$ represents a whole number not greater than five.

9. Polyethylene terephthalate fibers dyed with the compound of the formula

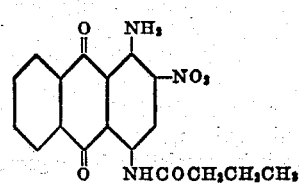

10. Polyethylene terephthalate fibers dyed with the compound of the formula
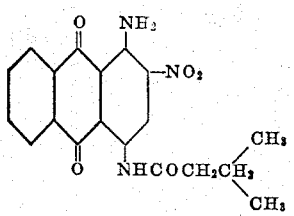
References Cited in the file of this patent
UNITED STATES PATENTS
| | | |
|---|---|---|
| 2,063,027 | Buxbaum | Dec. 8, 1936 |
| 2,155,673 | Miller | Apr. 25, 1939 |
OTHER REFERENCES
Vickerstaff: The Physical Chem. of Dyeing, Intersci. Pub. Inc., 1954, pp. 485–486.
Lubs, H.A.: "The Chem. of Synthetic Dyes and Pigments," Reinhold Pub. Co., N.Y., 1955, pp. 417–426.

UNITED STATES PATENT OFFICE
CERTIFICATE OF CORRECTION

Patent No. 2,918,344            December 22, 1959

Walter Jenny

It is hereby certified that error appears in the printed specification of the above numbered patent requiring correction and that the said Letters Patent should read as corrected below.

Column 3, line 73, for "in which is an acyl radical—COR" read -- in which—COR is an acyl radical --.

Signed and sealed this 31st day of May 1960.

(SEAL)
Attest:

KARL H. AXLINE
Attesting Officer

ROBERT C. WATSON
Commissioner of Patents